US011985603B2

United States Patent
Fakoorian et al.

(10) Patent No.: US 11,985,603 B2
(45) Date of Patent: May 14, 2024

(54) MAINTAINING PHASE CONTINUITY IN UPLINK TRANSMISSIONS FOR JOINT CHANNEL ESTIMATION

(71) Applicant: Apple Inc., Cupertino, CA (US)

(72) Inventors: Seyed Ali Akbar Fakoorian, San Diego, CA (US); Dawei Zhang, Saratoga, CA (US); Hong He, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 17/646,800

(22) Filed: Jan. 3, 2022

(65) Prior Publication Data

US 2022/0225240 A1 Jul. 14, 2022

Related U.S. Application Data

(60) Provisional application No. 63/199,642, filed on Jan. 14, 2021.

(51) Int. Cl.
*H04W 72/1268* (2023.01)
*H04L 5/00* (2006.01)
*H04L 25/02* (2006.01)
*H04W 52/14* (2009.01)

(52) U.S. Cl.
CPC ......... *H04W 52/146* (2013.01); *H04L 5/0051* (2013.01); *H04L 25/0224* (2013.01)

(58) Field of Classification Search
CPC .. H04W 52/146; H04W 52/20; H04L 5/0051; H04L 25/0224
See application file for complete search history.

(56) References Cited

U.S. PATENT DOCUMENTS

| | | | | |
|---|---|---|---|---|
| 10,798,731 B2* | 10/2020 | Lee | ................... | H04W 72/1268 |
| 10,945,216 B2* | 3/2021 | MolavianJazi | ... | H04W 72/1268 |
| 11,153,872 B2* | 10/2021 | Huang | ............. | H04W 74/0808 |
| 11,350,370 B2* | 5/2022 | MolavianJazi | ... | H04W 72/1268 |
| 11,792,739 B2* | 10/2023 | MolavianJazi | ..... | H04W 52/365 |
| | | | | 455/522 |

(Continued)

FOREIGN PATENT DOCUMENTS

| | | |
|---|---|---|
| WO | 2020/007340 | 1/2020 |
| WO | 2020/013559 | 1/2020 |
| WO | 2020/029035 | 2/2020 |

OTHER PUBLICATIONS

"Technical Specification Group Radio Access Network; NR; User Equipment (UE) radio access capabilities (Release 16)", 3GPP TS 38.306 v16.1.0, Jul. 22, 2020, 106 sheets.

*Primary Examiner* — Hai V Nguyen
(74) *Attorney, Agent, or Firm* — Fay Kaplun & Marcin, LLP

(57) ABSTRACT

A user equipment (UE) is configured to transmit an uplink transmission with a bundling of demodulated reference signals (DMRS), transmit the uplink transmission, receive a downlink control information (DCI) transmission from the base station between repetitions of the uplink transmission, wherein the DCI indicates a transmission power control (TPC) information element (IE) indicating remaining ones of the repetitions of the uplink transmission should be transmitted using a new transmission power and determine if the DCI is a group common (GC)-DCI Format 2_2.

20 Claims, 6 Drawing Sheets

(56) References Cited

U.S. PATENT DOCUMENTS

| | | | |
|---|---|---|---|
| 2019/0261354 A1* | 8/2019 | Fakoorian | H04W 72/23 |
| 2019/0313436 A1* | 10/2019 | Lee | H04L 5/0051 |
| 2020/0022144 A1 | 1/2020 | Papasakellariou | |
| 2020/0229104 A1* | 7/2020 | MolavianJazi | H04W 72/1268 |
| 2020/0404692 A1 | 12/2020 | Yin et al. | |
| 2021/0120559 A1 | 4/2021 | Li et al. | |
| 2021/0168726 A1* | 6/2021 | MolavianJazi | H04W 72/1268 |
| 2021/0266911 A1 | 8/2021 | Zhao | |
| 2021/0399840 A1* | 12/2021 | Yi | H04L 27/2601 |
| 2022/0038211 A1* | 2/2022 | Talarico | H04L 1/189 |
| 2022/0078728 A1* | 3/2022 | Yi | H04W 48/16 |
| 2022/0224475 A1* | 7/2022 | Taherzadeh Boroujeni | H04L 5/0053 |
| 2022/0295415 A1* | 9/2022 | MolavianJazi | H04W 52/54 |
| 2022/0369235 A1* | 11/2022 | Chen | H04W 52/146 |
| 2023/0345432 A1* | 10/2023 | Deng | H04L 1/1864 |
| 2023/0345470 A1* | 10/2023 | Yao | H04W 72/1268 |
| 2023/0396393 A1* | 12/2023 | Yao | H04B 7/0695 |
| 2023/0403683 A1* | 12/2023 | He | H04W 72/12 |

\* cited by examiner

MAINTAINING PHASE CONTINUITY IN UPLINK TRANSMISSIONS FOR JOINT CHANNEL ESTIMATION

PRIORITY CLAIM/INCORPORATION BY REFERENCE

This application claims priority to U.S. Provisional Application Ser. No. 63/199,642 filed on Jan. 14, 2021 and entitled, "Maintaining Phase Continuity in Uplink Transmissions for Joint Channel Estimation," the entirety of which is incorporated herein by reference.

BACKGROUND

In 5G new radio (NR) wireless communications, bundling of demodulation reference signals (DMRSs) in the time domain across one or more repetitions may be configured to allow a user equipment (UE) to perform joint channel estimation based on DMRS(s) received across repetitions (as opposed to performing channel estimation separately for each reception based on the DMRS(s) received in that repetition). During DMRS bundling, it may be advantageous for the UE to maintain transmission power consistency and phase continuity across physical uplink control channel (PUCCH) and/or physical uplink shared channel (PUSCH) repetitions.

SUMMARY

Some exemplary embodiments are related to a processor of a user equipment (UE) configured to perform operations. The operations include transmitting an uplink transmission with a bundling of demodulated reference signals (DMRS), transmitting the uplink transmission, receiving a downlink control information (DCI) transmission from the base station between repetitions of the uplink transmission, wherein the DCI indicates a transmission power control (TPC) information element (IE) indicating remaining ones of the repetitions of the uplink transmission should be transmitted using a new transmission power and determining if the DCI is a group common (GC)-DCI Format 2_2.

Other exemplary embodiments are related to a user equipment (UE) having a transceiver configured to communicate with a network and a processor communicatively coupled to the transceiver and configured to perform operations. The operations include transmitting an uplink transmission with a bundling of demodulated reference signals (DMRS), transmitting the uplink transmission, receiving a downlink control information (DCI) transmission from the base station between repetitions of the uplink transmission, wherein the DCI indicates a transmission power control (TPC) information element (IE) indicating remaining ones of the repetitions of the uplink transmission should be transmitted using a new transmission power and determining if the DCI is a group common (GC)-DCI Format 2_2.

Still further exemplary embodiments are related to a processor of a user equipment (UE) configured to perform operations. The operations include transmitting a first physical uplink control channel (PUCCH) transmission with a bundling of demodulated reference signals (DMRS), transmitting a second PUCCH, determining that the second PUCCH overlaps with one or more repetitions of the first PUCCH and dropping a predetermined one of the first PUCCH or the second PUCCH in occasions corresponding to the one or more repetitions.

DETAILED DESCRIPTION

Figure 1:
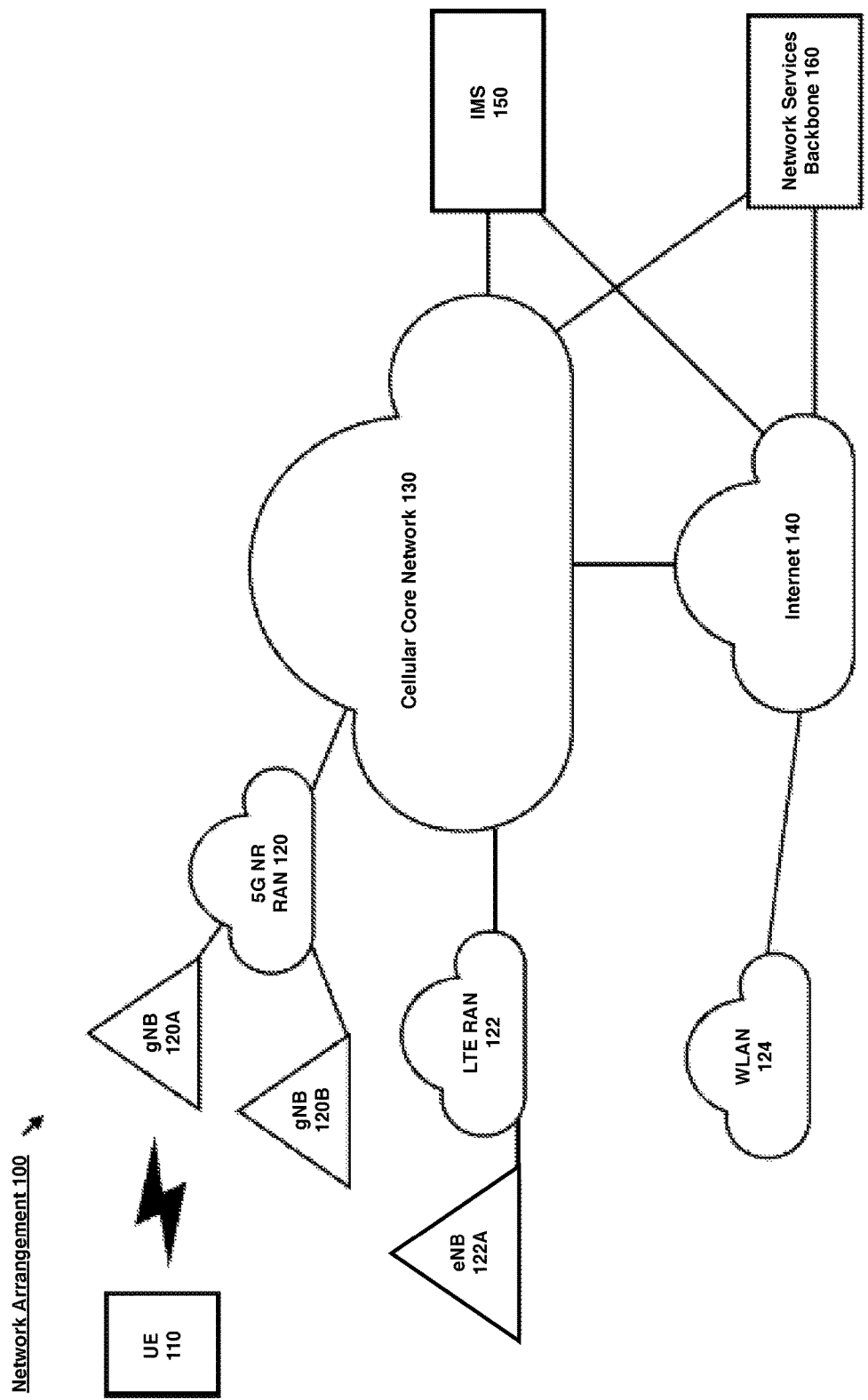
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) maintaining phase continuity across physical uplink shared channel (PUSCH) and/or physical uplink control channel (PUCCH) transmission repetitions.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G new radio (NR) radio access technology (RAT). However, while the exemplary embodiments are described with reference to a 5G NR RAT, it should be understood that the exemplary embodiments may also be implemented for other types of networks, e.g., Long Term Evolution (LTE) networks, next generation networks, etc.

In current 5G NR wireless communications, if a physical uplink control channel (PUCCH) transmission collides with a physical uplink shared channel (PUSCH) transmission, the uplink control information (UCI) of the PUCCH is multiplexed with the PUSCH repetition and the PUCCH is dropped. However, the transmission power of the UCI-multiplexed PUSCH repetition may be changed by a higher layer deltaMCS information element (IE) relative to the other PUSCH repetitions that are not multiplexed. The deltaMCS is intended to mitigate the difference in the modulation and coding scheme (MCS) of the PUCCH and the PUSCH. As a result, phase continuity in the transmission power at the UE is lost.

According to some exemplary embodiments, when a PUCCH collides with a PUSCH repetition, the UE multiplexes the UCI with the PUSCH repetition and is configured to maintain the same transmission power used for previous PUSCH repetitions or change transmission power based on a higher layer deltaMCS information element (IE) for the UCI-multiplexed PUSCH repetition and every PUSCH repetition thereafter. As a result, phase continuity is maximized.

Another issue that adversely affects phase continuity is the dropping of one PUCCH when two (or more) PUCCH transmissions overlap on one or more occasions (e.g., one or more slots or repetitions). The dropping of one PUCCH is based on a predefined UCI priority (HARQ-ACK>SR>CSI) or the time the PUCCHs transmissions begin. Because one of the PUCCHs with its corresponding repetitions are dropped (lost), phase continuity is lost.

According to some exemplary embodiments, when two or more PUCCH transmissions overlap on one or more occasions (e.g., one or more slots or repetitions), the UE is configured to (a) drop the one or more PUCCHs without DMRS bundling, (b) drop the PUCCH with DMRS bundling but maintain the transmission power associated with the PUCCH with DMRS bundling for the PUCCH without DMRS bundling, or (c) drop the PUCCH with DMRS bundling, but resume the remaining repetitions, if any, at subsequent occasions (e.g., slots) after the collision.

Another issue that adversely affects phase continuity is that in current 5G NR communications, a transmission power control (TPC) command is applied every transmission occasion. If a UE receives a subsequent DCI(s) in between PUSCH/PUCCH repetitions, then the TPC values in the DCI(s) result in different transmission powers for some repetitions. As a result, phase continuity is lost.

According to some exemplary embodiments, a UE is configured to disregard a group common (GC) DCI Format 2_2 including a TPC command and only utilize a TPC command contained in a unicast (UE-specific) DCI. The utilized TPC command is applied to all remaining PUSCH repetitions, regardless of whether or not those repetitions are configured with DMRS bundling.

Another issue that adversely affects phase continuity is when the total transmission power exceeds a maximum transmission power capability of the UE. As such, the UE will prioritize transmission power allocation. Current priority rules based on data priority of the transmissions (e.g., enhanced mobile broadband (eMBB), ultra reliable low latency communications (URLLC)) and a component carrier (CC) index may result in power inconsistencies across repetitions of a PUSCH with DMRS bundling. As a result, phase continuity is lost.

According to some exemplary embodiments, the UE is configured to prioritize the allocation of a transmission power for a PUSCH transmission with DMRS bundling over a transmission power for a PUSCH transmission without DMRS bundling regardless of which CC the PUSCH transmission is on when both PUSCHs have the same data priority (e.g., both eMBB or both URLLC).

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UE being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Thus, either simultaneously or alternatively, the UE 110 may connect to the 5G NR-RAN 120 via the gNBs 120A and 120B. In the present example, it may be considered that the gNB 120A is part of CG1 and the gNB 120B is part of CG2. Thus, in DC operation, the UE 110 may be simultaneously connected to gNB 120 A (CG1) and gNB 120B (CG2). Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120 and 122 the network arrangement 100 also includes a cellular core network 130. The cellular core network 130 may be considered to be the interconnected set of components that manages the operation and traffic of the cellular network.

Figure 2:
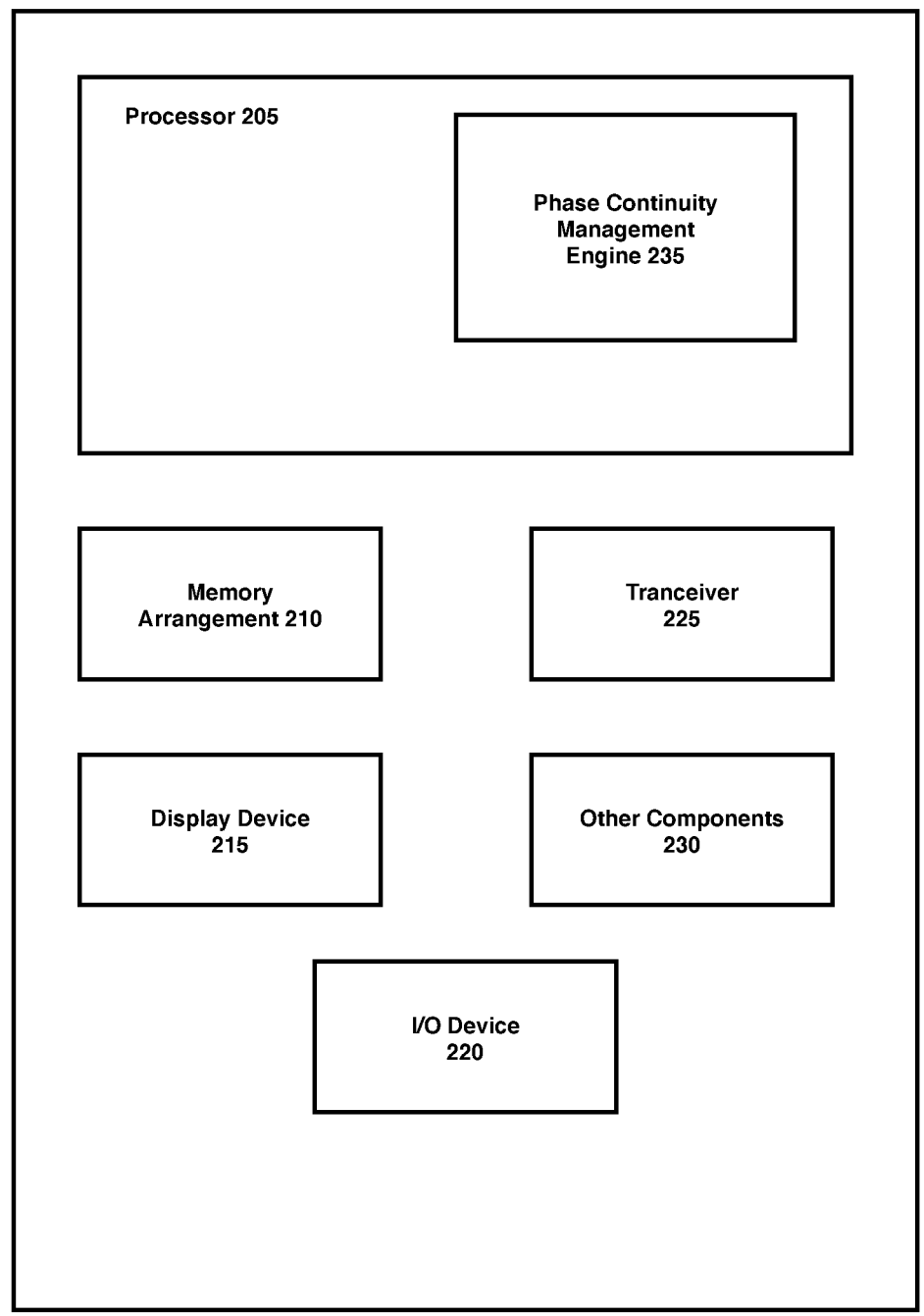
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a phase continuity management engine 235. The phase continuity management engine 235 may perform various operations related to maximizing phase continuity across PUSCH and/or PUCCH transmissions configured with DMRS bundling to ensure accurate joint channel estimation at the gNB 120A (or 120B).

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
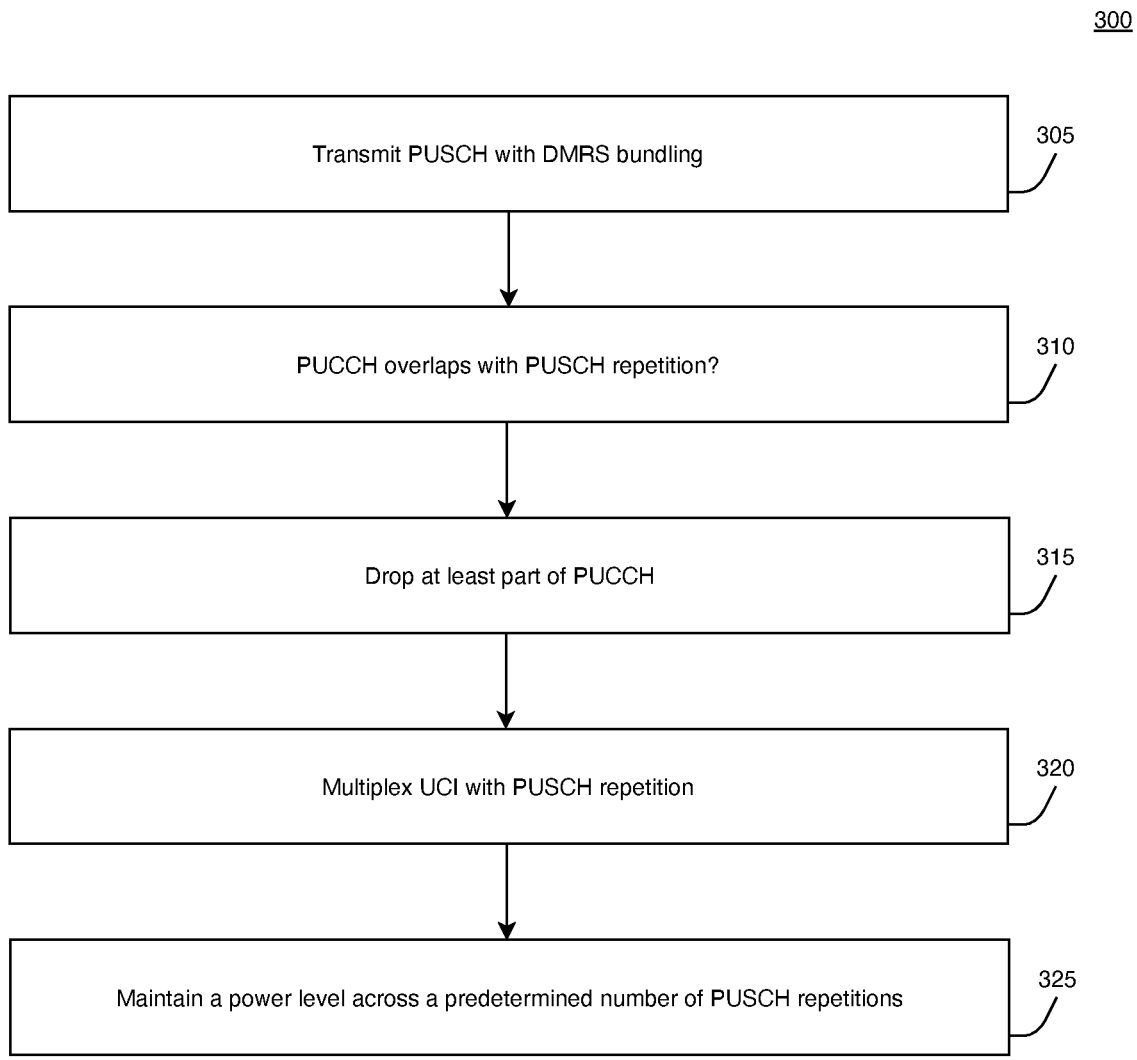
FIG. 3 shows a method for maintaining phase continuity across physical uplink shared channel (PUSCH) repetitions according to various exemplary embodiments.

FIG. 3 shows a method 300 for maintaining phase continuity across physical uplink shared channel (PUSCH) repetitions according to various exemplary embodiments. At 305, the UE 110 transmits a PUSCH transmission with a plurality of repetitions and with a bundling of the DMRSs. At 310, the UE 110 determines that a configured PUCCH transmission overlaps with one of the repetitions of the PUSCH. To maintain phase continuity, at 315, the UE 110 drops at least part of the PUCCH. At 320, the UE 110 multiplexes the uplink control information (UCI) with the PUSCH repetition with which the PUCCH overlapped and drops the remainder of the PUCCH. At 325, the UE 110 maintains a constant power level across a predetermined number of repetitions of the PUSCH.

In some embodiments, the UCI is partially multiplexed with the PUSCH repetition. For example, in some embodiments, only the hybrid automatic repeat request acknowledgement (HARQ-ACK) and/or the scheduling request (SR) of the UCI are multiplexed with the PUSCH repetition. In some embodiments, the entire UCI may be multiplexed with the PUSCH repetition. In some embodiments, the resulting deltaMCS signaling does not cause a change in transmission power of the UCI-multiplexed PUSCH. As such, the predetermined number of PUSCH repetitions for which the transmission power level is maintained is all of the PUSCH repetitions. In some embodiments, the deltaMCS is zero. In some embodiments, the deltaMCS may cause a change in transmission power of the UCI-multiplexed PUSCH. In such a scenario, however, the UE 110 maintains the same transmission power for the remaining PUSCH repetitions, if any, as the UCI-multiplexed PUSCH repetition. As such, the predetermined number of PUSCH repetitions for which the transmission power level is maintained is the PUSCH repetitions following the UCI-multiplexed PUSCH.

In some embodiments, if the deltaMCS causes a change in the transmission power, the UE 110 may determine whether or not to maintain phase continuity based on a UE capability. In some embodiments, the gNB 120A may indicate to the UE 110 that phase continuity is no longer necessary and, as such, the UE 110 may incorporate a change in the transmission power based on the deltaMCS IE. In some embodiments, the gNB 120A is not permitted to transmit a non-zero deltaMCS to the UE 110. In some embodiments, the method 300 may end at 315 with the dropping of the entire PUCCH and avoiding any UCI multiplexing.

Figure 4:
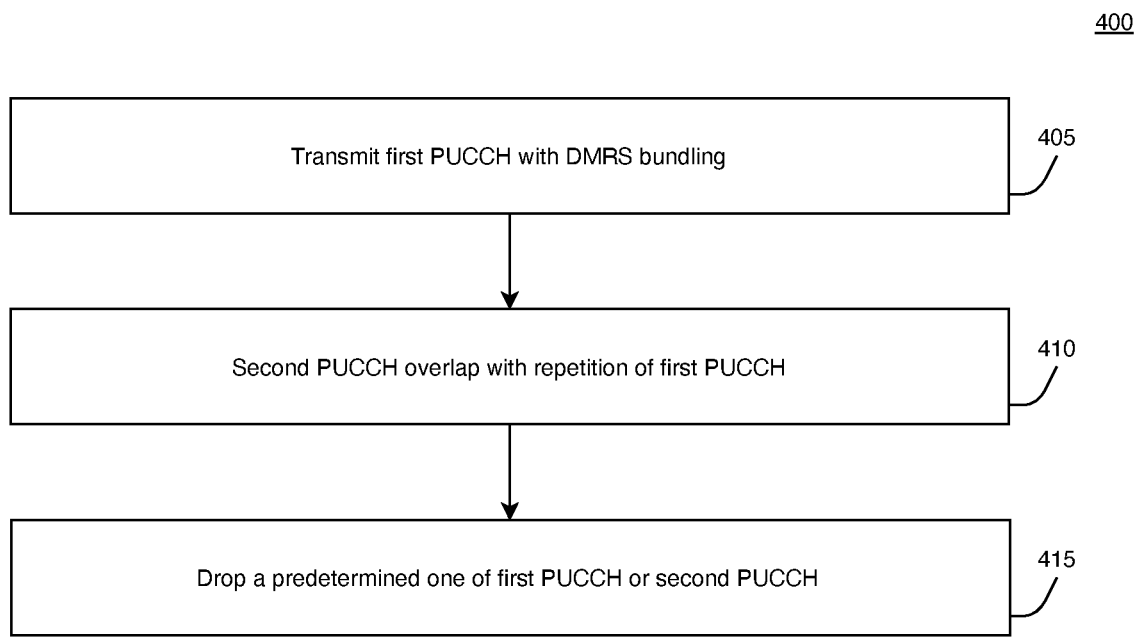
FIG. 4 shows a method for maintaining phase continuity across physical uplink control channel (PUCCH) repetitions according to various exemplary embodiments.

FIG. 4 shows a method 400 for maintaining phase continuity across physical uplink control channel (PUCCH) repetitions according to various exemplary embodiments. At 405, the UE 110 transmits a first PUCCH with DMRS bundling. At 410, the UE 110 determines that a second PUCCH overlaps with one or more of the repetitions of the first PUCCH. At 415, the UE 110 drops a predetermined one of the first PUCCH or the second PUCCH in the overlapping occasions.

Based on current 3GPP standards, the PUCCH with the lower UCI priority and/or the later starting slot would be dropped. At 415, however, in some embodiments, the UE 110 drops the second PUCCH, which is not DMRS bundled, regardless of its UCI type or starting slot. In some embodiments, the gNB 120A is not permitted to configure the second PUCCH with a higher priority UCI type compared to the first PUCCH or to schedule the second PUCCH in an earlier slot than the first PUCCH (if both PUCCHs have the same UCI priority).

In some embodiments, the UE 110 may follow current 3GPP standards, but if doing so results in the first PUCCH (with DMRS bundling) being dropped, the UE 110 maintains the transmission power used for the first PUCCH when transmitting the second PUCCH. That is, there is no change in the transmission power even though the UE 110 drops the first PUCCH and transmits the second PUCCH instead.

In some embodiments, the UE 110 may follow current 3GPP standards, but if doing so results in the first PUCCH (with DMRS bundling) being dropped, the UE 110 resumes the remaining repetitions of the first PUCCH, if any. In some embodiments, the UE 110 may use the transmission power corresponding to the second PUCCH when resuming the transmission of the remaining repetitions of the first PUCCH to maintain phase continuity after the overlapping occasion(s). In some embodiments, the UE 110 may not maintain phase continuity after the collision between the two PUCCHs. In some embodiments, the UE 110 may maintain phase continuity for the repetitions of the first PUCCH after the collision (if any). For example, if the first PUCCH is configured with four repetitions and the collision with the second PUCCH occurs at the second repetition, then the third and fourth repetitions resume the phase continuity of the first PUCCH.

Figure 5:
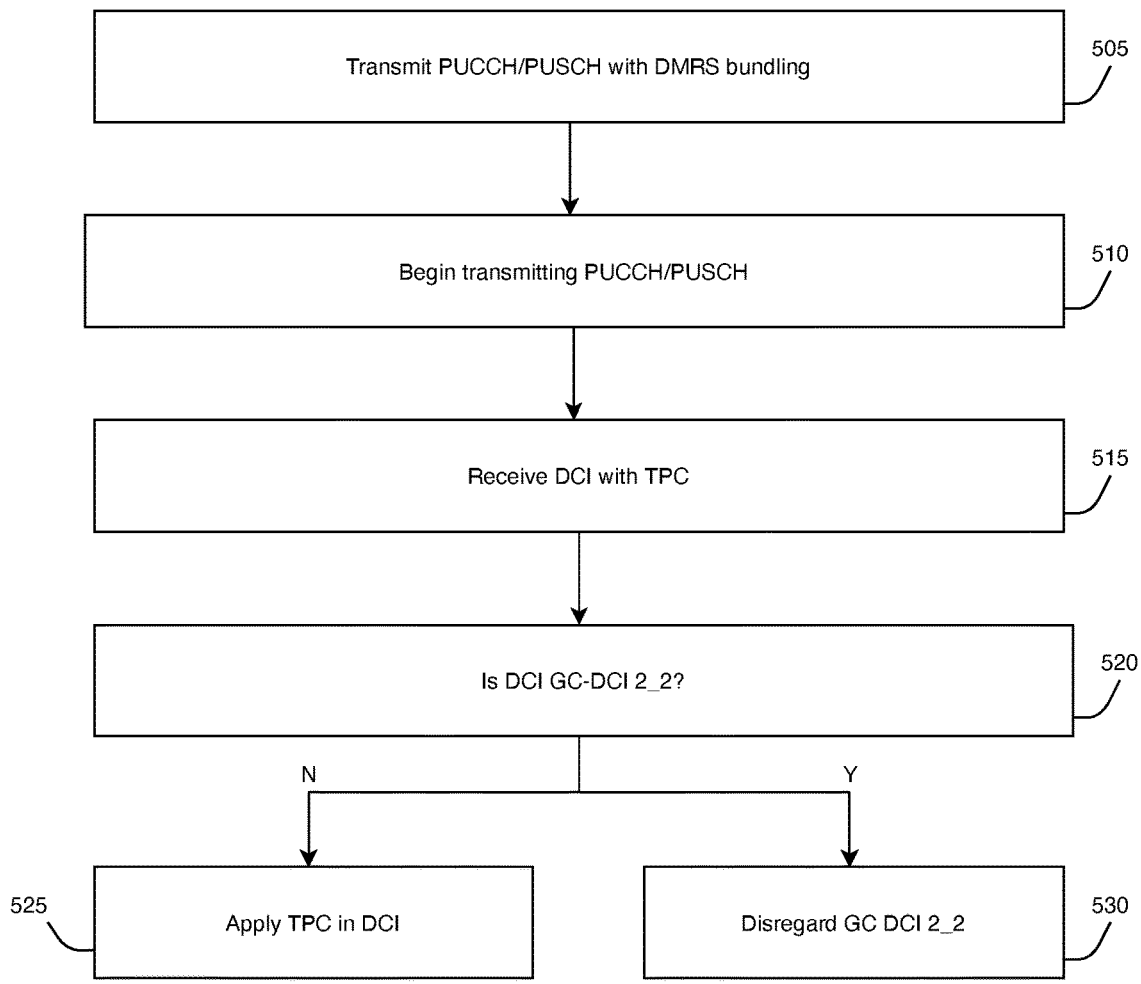
FIG. 5 shows a method for handling a received transmission power control (TPC) to maintain phase continuity across PUSCH/PUCCH repetitions according to various exemplary embodiments.

FIG. 5 shows a method 500 for handling a received transmission power control (TPC) to maintain phase continuity across PUSCH/PUCCH repetitions according to various exemplary embodiments. At 505, the UE 110 transmits a PUCCH (or PUSCH) with bundling of the DMRSs. At 510, the UE 110 begins transmitting the PUCCH (or PUSCH). At 515, the UE 110 receives a DCI including a transmit power control (TPC) value in between repetitions of the PUCCH (or PUSCH). At 515, the UE 110 determines if the received DCI is a UE-specific (unicast) DCI or if it is a group common (GC)-DCI Format 2_2 (used to indicate TPC). If the received DCI is a UE-specific DCI, then, at 525, the UE 110 applies the new TPC indicated in the DCI. In some embodiments, the new TPC may serve as an indication by the gNB 120A that the UE 110 no longer needs to maintain phase continuity and DMRS bundling is stopped from the instance the new TPC is applied. In some embodiments, the UE 110 applies new TPC and a new DMRS bundling based on the new TPC for the remaining repetitions or until another new TPC is received. That is, phase continuity is continued with the new transmit power for the remaining repetitions. If, however, at 520, the UE 110 determines that the received DCI is a GC-DCI Format 2_2, then, at 520, the UE 110 may disregard the received DCI.

Figure 6:
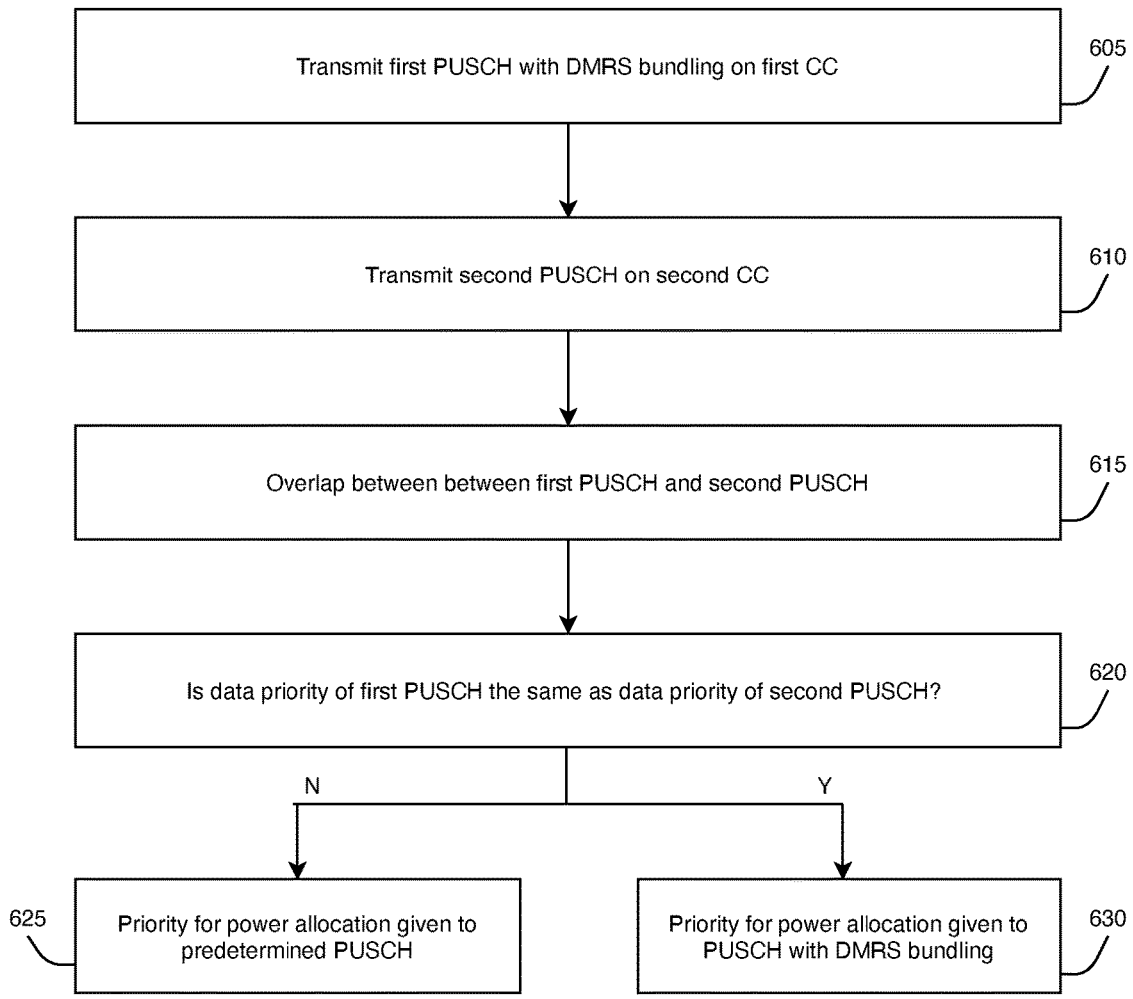
FIG. 6 shows a method of prioritizing a UE's power allocation across component carriers (CCs) to maintain phase continuity according to various exemplary embodiments.

FIG. 6 shows a method 600 of prioritizing a UE's power allocation across component carriers (CCs) to maintain phase continuity according to various exemplary embodiments. At 605, the UE 110 a first PUSCH on a first component carrier (CC). At 610, the UE 110 transmits a second PUSCH on a second CC. At 615, the UE 110 determines that a first PUSCH with DMRS bundling on a first CC overlaps with a second PUSCH without DMRS bundling on a second CC on one or more occasions (e.g., one or more slots or repetitions). At 620, the UE 110 determines if a data priority of the first PUSCH is the same as that of the second PUSCH. If the data priority of both PUSCHs are the same (e.g., both are eMBB or URLLC), then, at 630, the UE 110 gives a higher priority to the first PUSCH (with DMRS bundling) for power allocation irrespective of the CC index on which that PUSCH is transmitted.

If, however, at 620, the UE 110 determines that the data priority of the first PUSCH with DMRS bundling is different than that of the second PUSCH, then, at 625, the UE 110 gives priority for power allocation to a predetermined one of the first and second PUSCHs. In some embodiments, if the first PUSCH (with DMRS bundling) has a higher data priority (e.g., URLLC) than the second PUSCH (e.g., eMBB), then the UE 110 gives a higher priority to the first PUSCH for power allocation irrespective of the CC index on which that PUSCH is transmitted. In some embodiments, if the first PUSCH (with DMRS bundling) has a lower data priority (e.g., eMBB) than the second PUSCH (e.g., URLLC), then the UE 110 may drop the second PUSCH if it is transmitted on a configured grant (CG). In some embodiments, if the first PUSCH (with DMRS bundling) has the lower data priority, then the UE 110 may drop the first PUSCH for only the overlapping occasions or for all occasions beginning with the overlapping occasions. In some embodiments, the gNB 120A is not permitted a URLLC PUSCH that overlaps with an eMBB PUSCH indicated to keep phase continuity. In some embodiments, the UE 110 may base the prioritization of the PUSCHs for power allocation purposes on the CC index (e.g., a CC with a lower index has higher priority).

EXAMPLES

In a first example, a processor of a user equipment (UE) is configured to perform operations comprising transmitting a physical uplink shared channel (PUSCH) transmission with a bundling of demodulated reference signals (DMRS), determining that a physical uplink control channel (PUCCH) transmission overlaps with one or more repetitions of the PUSCH transmission, dropping at least part of the PUCCH transmission, multiplexing uplink control information (UCI) with the one or more repetitions of the PUSCH transmission and maintaining a transmission power level for a predetermined number of repetitions of the PUSCH transmission.

In a second example, the processor of the first example, wherein the UCI is partially multiplexed with the one or more repetitions of the PUSCH transmission, and wherein at least one of a hybrid automatic repeat request acknowledgement (HARQ-ACK) and a scheduling request (SR) of the UCI is multiplexed with the one of more repetitions of the PUSCH transmission.

In a third example, the processor of the first example, wherein an entirety of the UCI is multiplexed with the one or more repetitions of the PUSCH transmission, and wherein the operations further comprise disregarding a change of power that would result from a received deltaMCS information element (IE) with a non-zero value.

In a fourth example, the processor of the first example, wherein the predetermined number of repetitions of the PUSCH transmission includes all repetitions of the PUSCH transmission.

In a fifth example, the processor of the first example, wherein the predetermined number of repetitions of the PUSCH transmission includes those of the repetitions following the one or more repetitions where the PUCCH overlaps with the PUSCH.

In a sixth example, a processor of a user equipment (UE) is configured to perform operations comprising transmitting a first physical uplink shared channel (PUSCH) transmission with a bundling of demodulated reference signals (DMRS) on a first component carrier, transmitting a second PUSCH on a second CC, determining that the second PUSCH overlaps with one or more repetitions of the first PUSCH, determining a data priority of the first PUSCH and the second PUSCH and prioritizing a predetermined one of the first PUSCH or the second PUSCH for power allocation.

In a seventh example, the processor of the sixth example, wherein, when the data priority of the first PUSCH and the second PUSCH are the same, the first PUSCH is given priority for power allocation.

In an eighth example, the processor of the sixth example, wherein, when the data priority of the first PUSCH is greater than that of the second PUSCH, the first PUSCH is given priority for power allocation.

In a ninth example, the processor of the sixth example, wherein, when the data priority of the first PUSCH is less than that of the second PUSCH, the second PUSCH is dropped if the second PUSCH is transmitted on a configured grant (CG).

In a tenth example, the processor of the sixth example, wherein, when the data priority of the first PUSCH is less than that of the second PUSCH, the repetitions of the first PUSCH are dropped for overlapping occasions.

In an eleventh example, the processor of the sixth example, wherein, when the data priority of the first PUSCH is less than that of the second PUSCH, all remaining repetitions of the first PUSCH after the overlap are dropped.

In a twelfth example, a user equipment (UE), comprises a transceiver configured to communicate with a network and a processor communicatively coupled to the transceiver and configured to perform operations comprising transmitting a physical uplink shared channel (PUSCH) transmission with a bundling of demodulated reference signals (DMRS), determining that a physical uplink control channel (PUCCH)

transmission overlaps with one or more repetitions of the PUSCH transmission, dropping at least part of the PUCCH transmission, multiplexing uplink control information (UCI) with the one or more repetitions of the PUSCH transmission, and maintaining a transmission power level for a predetermined number of repetitions of the PUSCH transmission.

In a thirteenth example, the UE of the twelfth example, wherein the UCI is partially multiplexed with the one or more repetitions of the PUSCH transmission, and wherein at least one of a hybrid automatic repeat request acknowledgement (HARQ-ACK) and a scheduling request (SR) of the UCI is multiplexed with the one of more repetitions of the PUSCH transmission.

In a fourteenth example, the UE of the twelfth example, wherein an entirety of the UCI is multiplexed with the one or more repetitions of the PUSCH transmission, and wherein the operations further comprise disregarding a change of power that would result from a received deltaMCS information element (IE) with a non-zero value.

In a fifteenth example, the UE of the twelfth example, wherein the predetermined number of repetitions of the PUSCH transmission includes all repetitions of the PUSCH transmission.

In a sixteenth example, the UE of the twelfth example, wherein the predetermined number of repetitions of the PUSCH transmission includes those of the repetitions following the one or more repetitions where the PUCCH overlaps with the PUSCH.

In a seventeenth example, a user equipment (UE) comprises a transceiver configured to communicate with a network and a processor communicatively coupled to the transceiver and configured to perform operations comprising transmitting a first physical uplink control channel (PUCCH) transmission with a bundling of demodulated reference signals (DMRS), transmitting a second PUCCH, determining that the second PUCCH overlaps with one or more repetitions of the first PUCCH and dropping a predetermined one of the first PUCCH or the second PUCCH in occasions corresponding to the one or more repetitions.

In an eighteenth example, the UE of the seventeenth example, wherein the second PUCCH is dropped in the occasions corresponding to the one or more repetitions.

In a nineteenth example, the UE of the seventeenth example, wherein the operations further comprise determining a UCI priority corresponding to each of the first PUCCH and the second PUCCH, wherein, when the UCI priority of the first PUCCH is less than that of the second PUCCH, the predetermined one of the first PUCCH or the second PUCCH is the first PUCCH, and wherein, if the UCI priority of the first PUCCH is the same as that of the second PUCCH, the predetermined one of the first PUCCH or the second PUCCH is the PUCCH that begins in an earlier slot.

In a twentieth example, the UE of the nineteenth example, wherein, when the first PUCCH is dropped, a transmission power used to transmit the second PUCCH is the same as that used to transmit the first PUCCH.

In a twenty first example, the UE of the nineteenth example, wherein, when the first PUCCH is dropped, the operations further comprise resuming remaining repetitions of the first PUCCH after overlapping occasions.

In a twenty second example, the UE of the twenty first example, wherein the remaining repetitions of the first PUCCH are transmitted using the same transmission power used to transmit the PUCCH in the overlapping occasions.

In a twenty third example, the UE of the twenty first example, wherein the UE does not maintain phase continuity for the remaining repetitions of the first PUCCH.

In a twenty fourth example, the UE of the twenty first example, wherein the UE maintains a phase continuity of the first PUCCH for the remaining repetitions of the first PUCCH.

In a twenty fifth example, a user equipment (UE) comprises a transceiver configured to communicate with a network and a processor communicatively coupled to the transceiver and configured to perform operations comprising transmitting a first physical uplink shared channel (PUSCH) transmission with a bundling of demodulated reference signals (DMRS) on a first component carrier, transmitting a second PUSCH on a second CC, determining that the second PUSCH overlaps with one or more repetitions of the first PUSCH, determining a data priority of the first PUSCH and the second PUSCH and prioritizing a predetermined one of the first PUSCH or the second PUSCH for power allocation.

In a twenty sixth example, the UE of the twenty fifth example, wherein, when the data priority of the first PUSCH and the second PUSCH are the same, the first PUSCH is given priority for power allocation.

In a twenty seventh example, the UE of the twenty fifth example, wherein, when the data priority of the first PUSCH is greater than that of the second PUSCH, the first PUSCH is given priority for power allocation.

In a twenty eighth example, the UE of the twenty fifth example, wherein, when the data priority of the first PUSCH is less than that of the second PUSCH, the second PUSCH is dropped if the second PUSCH is transmitted on a configured grant (CG).

In a twenty ninth example, the UE of the twenty fifth example, wherein, when the data priority of the first PUSCH is less than that of the second PUSCH, the repetitions of the first PUSCH are dropped for overlapping occasions.

In a thirtieth example, the UE of the twenty ninth example, wherein, when the data priority of the first PUSCH is less than that of the second PUSCH, all remaining repetitions of the first PUSCH after the overlap are dropped.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    transmitting an uplink transmission with a bundling of demodulated reference signals (DMRS);
    transmitting the uplink transmission;
    receiving a downlink control information (DCI) transmission from a base station between repetitions of the uplink transmission, wherein the DCI indicates a transmission power control (TPC) information element (IE) indicating remaining ones of the repetitions of the uplink transmission should be transmitted using a new transmission power; and
    determining if the DCI is a group common (GC)-DCI Format 2_2.

2. The processor of claim 1, wherein, when the DCI is a GC-DCI Format 2_2, the operation further comprise:
    disregarding the DCI and maintaining a transmission power used to transmit repetitions of the uplink transmission prior to receipt of the DCI.

3. The processor of claim 1, wherein, when the DCI is a UE-specific DCI, the operations further comprise:
    applying the new transmission power to remaining ones of the repetitions of the uplink transmission following receipt of the DCI.

4. The processor of claim 3, wherein the UE does not maintain a phase continuity following receipt of the DCI.

5. The processor of claim 3, wherein the operations further comprise:
    applying a new DMRS bundling using the new transmission power for remaining ones of the repetitions of the uplink transmission following receipt of the DCI.

6. The processor of claim 1, wherein the uplink transmission is one of a physical uplink shared channel (PUSCH) transmission or a physical uplink control channel (PUCCH) transmission.

7. A user equipment (UE), comprising:
    a transceiver configured to communicate with a base station; and
    a processor communicatively coupled to the transceiver and configured to perform operations comprising:
        transmitting an uplink transmission with a bundling of demodulated reference signals (DMRS);
        transmitting the uplink transmission;
        receiving a downlink control information (DCI) transmission from the base station between repetitions of the uplink transmission, wherein the DCI indicates a transmission power control (TPC) information element (IE) indicating remaining ones of the repetitions of the uplink transmission should be transmitted using a new transmission power; and
        determining if the DCI is a group common (GC)-DCI Format 2_2.

8. The UE of claim 7, wherein, when the DCI is a GC-DCI Format 2_2, the operation further comprise:
    disregarding the DCI and maintaining a transmission power used to transmit repetitions of the uplink transmission prior to receipt of the DCI.

9. The UE of claim 7, wherein, when the DCI is a UE-specific DCI, the operations further comprise:
    applying the new transmission power to remaining ones of the repetitions of the uplink transmission following receipt of the DCI.

10. The UE of claim 9, wherein the UE does not maintain a phase continuity following receipt of the DCI.

11. The UE of claim 9, wherein the operations further comprise:
    applying a new DMRS bundling using the new transmission power for remaining ones of the repetitions of the uplink transmission following receipt of the DCI.

12. The UE of claim 7, wherein the uplink transmission is one of a physical uplink shared channel (PUSCH) transmission or a physical uplink control channel (PUCCH) transmission.

13. A processor of a user equipment (UE) configured to perform operations comprising:
    transmitting a first physical uplink control channel (PUCCH) transmission with a bundling of demodulated reference signals (DMRS);
    transmitting a second PUCCH;
    determining that the second PUCCH overlaps with one or more repetitions of the first PUCCH; and
    dropping a predetermined one of the first PUCCH or the second PUCCH in occasions corresponding to the one or more repetitions.

14. The processor of claim 13, wherein the second PUCCH is dropped in the occasions corresponding to the one or more repetitions.

15. The processor of claim 13, wherein the operations further comprise:
    determining a UCI priority corresponding to each of the first PUCCH and the second PUCCH,
    wherein, when the UCI priority of the first PUCCH is less than that of the second PUCCH, the predetermined one of the first PUCCH or the second PUCCH is the first PUCCH, and
    wherein, if the UCI priority of the first PUCCH is the same as that of the second PUCCH, the predetermined one of the first PUCCH or the second PUCCH is the PUCCH that begins in an earlier slot.

16. The processor of claim 15, wherein, when the first PUCCH is dropped, a transmission power used to transmit the second PUCCH is the same as that used to transmit the first PUCCH.

17. The processor of claim 15, wherein, when the first PUCCH is dropped, the operations further comprise:
    resuming remaining repetitions of the first PUCCH after overlapping occasions.

18. The processor of claim 17, wherein the remaining repetitions of the first PUCCH are transmitted using the same transmission power used to transmit the PUCCH in the overlapping occasions.

19. The processor of claim 17, wherein the UE does not maintain phase continuity for the remaining repetitions of the first PUCCH.

20. The processor of claim 17, wherein the UE maintains a phase continuity of the first PUCCH for the remaining repetitions of the first PUCCH.

* * * * *